Jan. 2, 1940.  B. D. BEDFORD  2,185,700
ELECTRIC CONTROL SYSTEM
Original Filed Oct. 19, 1937   2 Sheets-Sheet 1
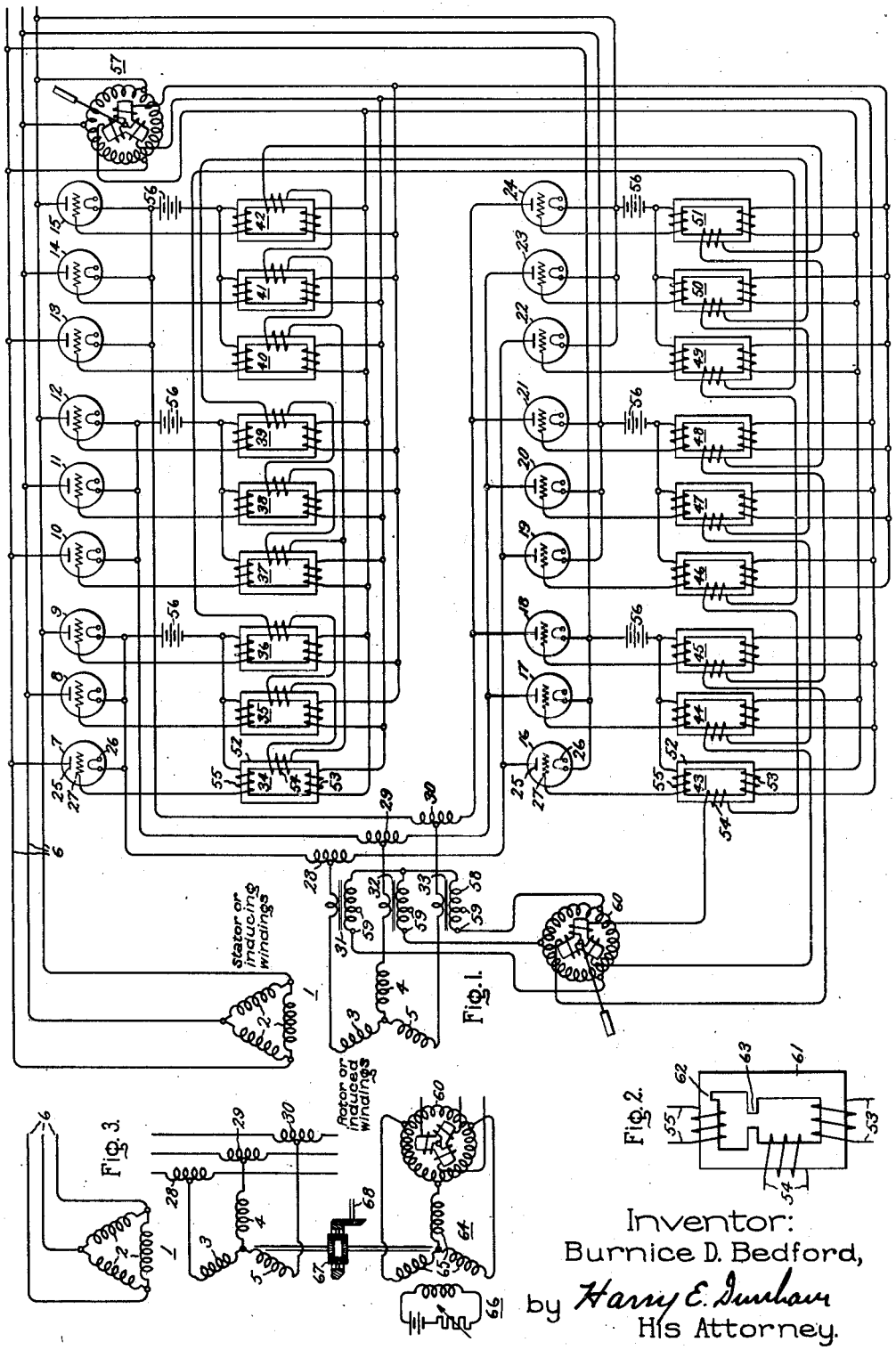
Inventor:
Burnice D. Bedford,
by Harry E. Dunham
His Attorney.

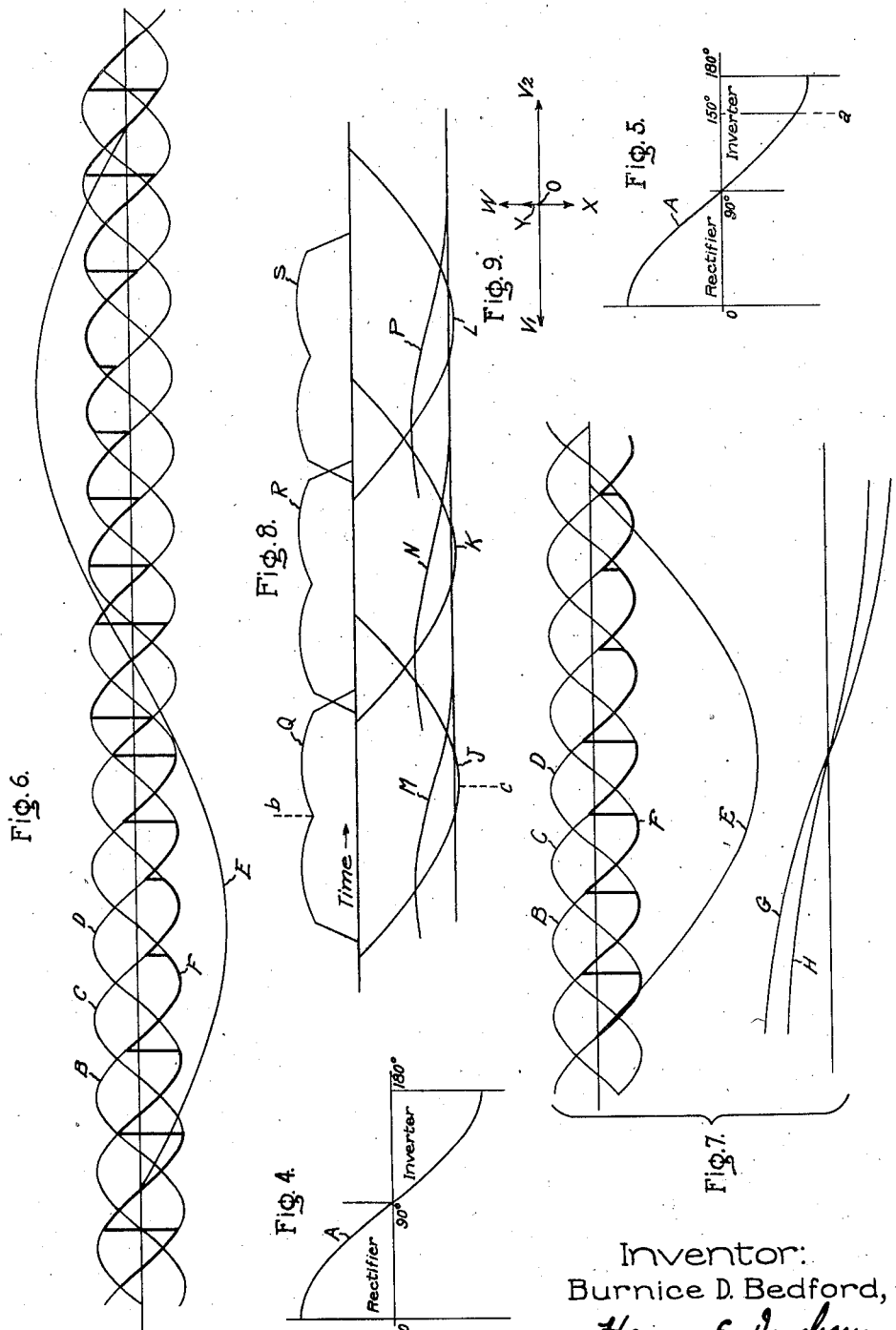

Patented Jan. 2, 1940

2,185,700

UNITED STATES PATENT OFFICE 2,185,700

ELECTRIC CONTROL SYSTEM

Burnice D. Bedford, Schenectady, N. Y., assignor to General Electric Company, a corporation of New York Application October 19, 1937, Serial No. 169,832
Renewed May 26, 1939

6 Claims. (Cl. 172—237)

My invention relates to electric control systems and more particularly to electric valve control systems for dynamo-electric machines of the induction type.

Heretofore, where electric valve systems have been employed to control an operating condition, such as the speed of induction machines, the control over a wide range of the operating condition has involved a material reduction in the power factor at which power is consumed by the controlling system and the induction machine. This reduction in power factor has been occasioned by the lagging current required by the induction machine and by the lagging current interchanged between the rotor winding of the induction machine and the supply circuit. There has been evidenced a decided need for improved electric valve control systems in which the power factor at which power is transmitted to or received from an induction machine is maintained at a relatively high value and which affords a greater flexibility of control than provided by the prior art arrangements. More specifically, in the control of induction motors there has been evidenced a need for electric valve control systems which afford a wide range of speed control without imposing on the associated supply circuit a disproportionately low power factor condition.

It is an object of my invention to provide a new and improved electric valve control system.

It is another object of my invention to provide a new and improved control system for electric valve translating apparatus.

It is a still further object of my invention to provide a new and improved excitation circuit for electric valve translating apparatus which controls an operating condition or an electric condition of dynamo-electric machines.

My invention concerns an improvement of the electric valve control system disclosed and broadly claimed in a copending application of Ernst F. W. Alexanderson, Serial No. 169,843, filed concurrently herewith, and assigned to the assignee of the present application. In accordance with the illustrated embodiment of my invention, I provide an electric valve converting system for controlling a dynamo-electric machine of the induction type in which the power factor of the machine is controllable without sacrificing the desired flexibility of control of a predetermined operating condition, such as the speed of the machine. More specifically, my invention relates to an improved excitation circuit for the electric valve translating apparatus to control the conductivities of the electric valves of the translating apparatus to effect these results. The electric valves of the translating apparatus are provided with control members which control the conductivities thereof, and the electric valves are arranged or interposed between the alternating current supply circuit and the rotor or induced windings of the induction machine to control the transfer of the power between the supply circuit and the rotor windings. The excitation circuits which include saturable control transformers, are energized in accordance with the voltage of the alternating current supply circuit and in accordance with an electrical condition of the rotor windings, such as the current of the rotor windings, to impress on the control members of the electric valves alternating control voltages to effect the transfer of power between the supply circuit and the rotor windings conjointly in accordance with electrical conditions of the respective circuits. By introducing in the excitation circuits a voltage which varies as an electrical condition, such as the currents of the rotor windings, I provide an arrangement which controls the power factor of the current interchanged between the alternating current circuit and the rotor windings and which also controls the power factor at which power is interchanged between the stator or inducing windings and the alternating current circuit. By the proper adjustment of the excitation circuits, the power factor of the induction machine may be maintained at unity, or in a leading relation, in which cases the electric valve converting system consumes a leading current from the alternating current supply circuit to neutralize effectively the lagging current consumed by the induction machine.

Fig. 1 of the accompanying drawings diagrammatically illustrates an embodiment of my invention as applied to an electric valve converting system for controlling the speed of an induction motor, and Figs. 2 and 3 represent certain modifications thereof. Figs. 4 to 9, inclusive, represent certain operating characteristics of the embodiment of my invention shown in Fig. 1. For a better understanding, reference may be had to the following description taken in connection with the accompanying drawings and its scope will be pointed out in the appended claims.

Referring now to Fig. 1, my invention is diagrammatically illustrated as applied to an electric valve converting system for controlling an electrical condition or an operating condition, such as the speed of a dynamo-electric machine 1 of the induction type having stator or inducing windings 2, and having rotor or induced windings 3, 4 and 5. The stator windings are connected to a polyphase alternating current supply circuit 6 and the rotor windings 3, 4 and 5 are arranged to receive power from, or transmit power to, the alternating current circuit 6 through electric valve translating apparatus comprising electric valves 7—24. The electric valves 7—24 are preferably of the type employing an ionizable medium, such as a gas or a vapor, and each comprises an anode 25, a cathode 26 and a control member 27. Electric valves 7—15 are similarly disclosed relative to circuit 6, that is, these valves have the anodes thereof connected to the circuit, and electric valves 16—24 are effectively connected in series relation with respect to the electric valves 7—15 and have the cathodes thereof connected to circuit 6. Current smoothing inductive reactances 28, 29 and 30 are interposed between the upper and lower groups of electric valves and intermediate connections thereof are connected to the terminals of rotor windings 3, 4 and 5 through current transformers 31, 32 and 33.

In order to control the conductivities of the electric valves 7—24 in accordance with the voltage of the alternating current circuit 6, and in accordance with an electrical condition, such as the current of the rotor windings, I provide a plurality of excitation circuits, including inductive devices or transformers 34—51. Transformers 34—51 are associated with electric valves 7—24 respectively. Each of the transformers comprises a core member 52, a primary winding 53, which is energized in accordance with the voltage of the alternating current circuit 6, a control winding 54 which is energized in accordance with an operating or electrical condition of machine 1 or such as the current of the rotor windings of the machine 1, and a winding 55 which is energized in accordance with the resultant flux produced by windings 53 and 54, and which impresses on the control member 27 of the associated electric valve, an alternating voltage which varies conjointly in accordance with the voltage of the circuit 6 and in accordance with the electrical condition or operating condition of the rotor windings 3, 4 and 5 of the machine 1. Suitable sources of negative unidirectional biasing potential, such as batteries 56, are employed to impress on the control members of the electric valves suitable biasing potentials. Any conventional phase shifting arrangement, such as a rotary phase shifter 57, may be interposed between the alternating current circuit 6 and the primary exciting windings 53 to control the phase of the exciting voltages impressed on control members 27. The rotary phase shifter 57 may be either manually or automatically operated.

To obtain voltages which vary in accordance with a predetermined operating condition or electrical condition of the machine 1, and to energize transformers 34—51 in accordance therewith, I employ the current transformers 31—33 which are connected to be responsive to the rotor current and each comprises a secondary winding 58 provided with tap connections 59 to control the magnitude of the voltage impressed on control windings 54. As a means for controlling the phase relationship of the alternating voltage which is responsive to the rotor current of machine 1, and hence to control the power factor of the current interchanged between the circuit 6 and rotor windings 3, 4 and 5, I provide any suitable phase shifting means such as a rotary phase shifter 60. The phase shifter 60 may be manually operated or may be arranged to be responsive to a predetermined electrical condition of the alternating current circuit 6, such as the power factor thereof, or may be arranged to be responsive to an electrical condition or an operating condition of the dynamo-electric machine 1.

It will be noted that as concerns the voltage of the rotor windings 3, 4 and 5, electric valves 7—9, 10—12, 13—15 are arranged to be rendered conductive at the same time relative to the voltages of the respective rotor windings 3, 4 and 5, and electric valves 16—18, 19—21 and 22—24 are arranged to be conductive at the same time, relative to the voltages of the respective phases of circuit 6. In other words, the electric valves 7—24 are arranged to permit the transfer of power between circuit 6 and rotor windings 3, 4 and 5 during both positive and negative half cycles of voltage of the rotor windings. Furthermore, the resultant alternating control voltages impressed on the control members 27 are controlled by the transformers 34—51 so that this transfer of power is effected conjointly in accordance with certain electrical conditions of the respective circuits.

Prior to the discussion of the operation of the embodiment of my invention shown in Fig. 1, the modifications represented in Figs. 2 and 3 will be considered. In Fig. 2 I have diagrammatically represented a modification of the transformers 34—51 which may be employed, if desired. The transformer thereof is of the saturable inductive type including a core member 61 having a restricted saturable section 62 and a shunt path 63 of relatively high reluctance which may include an air gap. The primary winding 53 and the control winding 54 are associated with the main portion of the core structure. The winding 55, which impresses an alternating voltage of peaked wave form on the associated control member, is associated with the portion of the core structure including the restricted saturable section 62. It will be understood that the voltage induced in winding 55 is of substantially peaked wave form and that the phase relation thereof relative to the voltages impressed on windings 53 and 54 is controlled conjointly in accordance with the phase relationships of voltages impressed on windings 53 and 54.

The modification of my invention shown in Fig. 3 is a fragmentary view of a portion of the arrangement shown in Fig. 1 and corresponding elements have been assigned like reference numerals. In the arrangement of Fig. 3, instead of employing the rotor current for controlling the energization of control windings 54, I provide a control system including a dynamo-electric machine 64 of the synchronous type, including armature windings 65 and a field circuit 66. The machine 64 may be driven at the slip frequency through a differential gearing 67. The shaft 68 may be connected to a synchronous motor (not shown) to effect this desired differential operation of the machine 64.

The general principles of operation of the control system diagrammatically illustrated in Fig. 1 will be considered first. As is well understood by those skilled in the art, the speed of a dynamo-electric machine of the induction type, when operating as a motor, may be controlled by variable impedance means connected in the rotor circuit. When an induction motor is operating below synchronous speed, the controlling means in the rotor circuit acts as an impedance to the flow of rotor current and power is transmitted from the rotor windings to the controlling means. On the other hand, when the motor is operating above synchronous speed, power must be transmitted from a supply circuit to the rotor windings. In this latter case there must be introduced in the rotor winding circuits a voltage or voltages which permit power to be transferred to the rotor windings.

Referring more particularly to the operation of the arrangement of my invention in Fig. 1 the electric valves 7—24 control the speed of the dynamo-electric machine I from standstill to speeds above synchronous speed. When it is desired to operate the machine I below synchronism, the electric valve converting system which is connected to the rotor windings 3, 4 and 5 operates as an inverter relative to the alternating current circuit to transmit energy from the rotor windings to the alternating current circuit 6 while the electric valves 7—24, under these conditions, operate as a rectifier relative to the voltage of the rotor windings 3, 4 and 5. That is, electric valves 7—24 perform dual functions. For the purpose of explaining the operation of the electric valve converting system including the various excitation circuits let it be assumed that it is desired to operate the induction motor I below synchronism. As stated above, for this range of speed the electric valves 7—24 operate as a rectifier relative to the voltage of the rotor windings 3, 4 and 5 and by virtue of this fact introduce in the rotor winding circuit voltages which oppose the voltages induced in the rotor windings by the stator or inducing windings. Referring to Fig. 4 the curve A represents the average voltage characteristic of an electric valve converting system for varying angular displacements between the voltages impressed on the control members and the voltages impressed on the associated anodes when the load circuit is substantially inductive. For a phase displacement of 90 electrical degrees from the position of maximum rectifier voltage, the voltage of the electric valve system is substantially zero and as the phase of the control voltages are retarded still further into the second quadrant the electric valve converting system changes from a rectifier to an inverter relative to the rotor windings. In order to adjust the excitation circuits including the transformers 34—51 to effect proper phase displacement of the control voltages impressed on control members 27, the rotary phase shifter 57 may be positioned so that the voltage impressed on the control members 27 relative to the anode voltages has the phase position indicated by line $a$ in Fig. 5 which corresponds to a lagging phase displacement of substantially 150 electrical degrees. Although this phase displacement may be varied considerably, it has been found that this displacement affords an adequate commutating angle. It is to be understood that the rotary phase shifter 57 controls only the phase of the voltage derived from the alternating current circuit 6 which is impressed on the exciting windings 53 of transformers 34—51.

Let it be assumed that the dynamo-electric machine is operating at a predetermined speed below synchronism. Of course, the speed at which the machine I operates will depend upon the opposing voltage introduced in the rotor winding circuits by the electric valves 7—24. The rotary phase shifter 60 which controls the phase of the voltages derived from the rotor windings may be adjusted so that the rotor currents are substantially in phase with the rotor winding voltages. This condition of operation is represented by the curves of Fig. 6 where curves B, C and D represent the three-phase system of voltages of the alternating current circuit 6, and curve E represents the rotor voltage of one phase, for example, the voltage appearing across the terminals of windings 3 and 4. In Fig. 6 the ratio of the frequency of the alternating current circuit 6 to the frequency of the rotor voltage is substantially 4:1. It is to be understood that the system is susceptible of operation within a wide range of frequency ratios. Curve F is representative of the resultant opposing voltages which are introduced in the rotor winding circuits by the electric valve converting system and which, of course, oppose the rotor winding voltages. It will be noted that the wave shape of the resultant opposing voltage, as represented by curve F, is in substantial phase coincidence with the rotor voltage E so that the power factor of the resultant current is substantially unity. Under this condition of operation the electric valves 7—24 conduct current conjointly in accordance with the voltage of circuit 6 and in accordance with the current of the rotor windings 3, 4 and 5. This dual control is effected by virtue of the dual excitation of the transformers 3, 4 and 5. For example, during a 60 degree interval of rotor winding voltage appearing across the terminals of windings 3 and 4 when the terminal of winding 3 is negative relative to that of winding 4 power will be transmitted from the windings 3 and 4 to the alternating current circuit 6 through a circuit including electric valves 17, 20 and 23 and electric valves 7, 8 and 9. During the next sixty degree interval of rotor voltage power will be transmitted from the rotor windings 3 and 5 to circuit 6 through a circuit including electric valves 18, 21 and 24 and electric valves 7, 8 and 9. In like manner, power will be transmitted from the phases including rotor windings 4 and 5, and 5 and 3 during both positive and negative half cycles of the voltages thereof.

By the proper adjustment of the rotary phase shifter 60, the phase of the voltages impressed on the control windings 54 of transformers 34—51 may be established so that the current in the rotor windings 3, 4 and 5 leads the rotor voltage by a substantial amount. That is, by the suitable adjustment of rotary phase shifter 60 the power factor of the current in the rotor windings 3, 4 and 5 may be made leading, and the power delivered by electric valve converting system to the circuit 6 may also be improved.

The effect of the low frequency excitation derived from the rotor circuit windings may be better understood by referring to the operating characteristics of Fig. 7. Under the conditions there represented, the rotor voltage or the low frequency voltage derived from the rotor windings in accordance with the current thereof is adjusted by the rotary phase shifter 60 so that it is displaced substantially 90 electrical degrees in the lagging direction. The phase position of the resultant opposing voltage afforded by electric valves 7—24 may be controlled by adjusting the position of rotary phase shifter 60, and the magnitude of the opposing voltage and hence the magnitude of the rotor current may be controlled by adjusting taps 59 on secondary windings 58 of transformers 31, 32 and 33. Curves G and H represent variations in the low frequency excitation impressed on transformers 34—51 by the employment of the tap connections 59.

In Fig. 8 of the accompanying drawings I have represented by curves J, K and L the voltages of the rotor windings 3, 4 and 5. Curves M, N and P represent the opposing voltages introduced in the rotor winding circuits by the electric valves 7—24 when operating as an inverter relative to the circuit 6. It will be understood that the opposing voltage varies materially and therefore the resultant current as represented by curves Q, R and S also varies materially. Under this condition of operation where the rotor currents modulate the voltages impressed on the control members 27 of electric valves 7—24 the rotor current, as represented by curves Q, R and S, is given a leading power factor relationship. Under the operating conditions represented in Fig. 8 the average or weighted value of the rotor current for one phases occurs at a time represented by the line $b$ and the maximum value of the corresponding rotor voltage occurs at a time corresponding to the position of line $c$. Accordingly, the rotor current has a leading power factor angle corresponding to the time between lines $b$ and $c$.

Since the current of the rotor windings 3, 4 and 5 may be made to have a leading power factor relationship with respect to the voltages of these windings, it will be understood that the excitation for the machine I may therefore be derived from the rotor winding and that there will be a reduction in the excitation current transmitted to the stator windings from the alternating current circuit 6, thereby effecting a material improvement in the power factor thereof. This feature may be more easily understood by referring to the vector diagram of Fig. 9 where the stator or applied voltage is represented by a vector $OV_1$ and the induced rotor winding voltage is represented by the vector $OV_2$. The magnetizing current as referred to the line voltage $OV_1$ may, of course, be represented by a vector $OW$ and the leading rotor current occasioned by the electric valves 7—24 when referred to the stator has a phase position corresponding to the vector $OX$. It is to be noted that the leading secondary current materially neutralizes the magnetizing or excitation current, as represented by vector $OW$, so that the resultant lagging current consumed by the stator windings of the induction machine I may be represented by the vector $OY$. Although for the purposes of explanation I have chosen to represent the instance in which the magnetizing or lagging current transmitted to the stator windings is not completely neutralized, it is to be understood that the excitation of the electric valves 7—24 may be controlled to effect complete neutralization of the lagging current, or even to control the dynamo-electric machine I so that the machine consumes the leading current from circuit 6.

While I have shown and described by invention as applied to a particular system of connections and as embodying various devices diagrammatically shown, it will be obvious to those skilled in the art that changes and modifications may be made without departing from my invention, and I, therefore, air in the appended claims to cover all such changes and modifications as fall within the true spirit and scope of my invention.

What I claim as new and desire to obtain by Letters Patent of the United States is:

1. In combination, an alternating current circuit, an induction dynamo-electric machine having an inducing winding and an induced winding, electric valve means comprising a control member and being connected between said circuit and said induced winding, and an excitation circuit comprising a saturable inductive device having a primary winding energized from said alternating current circuit, a second winding energized in accordance with an electrical condition of said induced winding and a third winding responsive to the resultant flux produced by said first mentioned and said second windings for impressing on said control member an alternating voltage of peaked wave form variable in phase to control the power factor at which power is interchanged between said inducing winding and said alternating current circuit.

2. In combination, an alternating current circuit, an induction dynamo-electric machine having an inducing winding and an induced winding, electric valve means comprising a control member and being connected between said circuit and said induced winding, and an excitation circuit comprising a saturable inductive device having a core member and a primary exciting winding energized from said alternating current circuit, a control winding energized in accordance with the current of said induced winding and a winding for impressing on said control member an alternating voltage of peaked wave form which varies in phase in accordance with the current of said induced winding to control the power factor at which power is interchanged between said alternating current circuit and said induced winding.

3. In combination, an alternating current circuit, a dynamo-electric machine having an inducing winding and an induced winding, two groups of electric valve means connected between said alternating current circuit and said induced winding each comprising a plurality of electric discharge paths and each path being provided with a control member, and a plurality of excitation circuits each associated with a different one of said electric valves and each comprising a saturable inductive device having a winding energized in accordance with the voltage of said alternating current circuit, a control winding energized in accordance with the current of said induced winding and a winding responsive to the resultant flux produced by said first mentioned winding and said control winding for impressing on the associated control member an alternating voltage of peaked wave form variable in phase to control the power factor at which power is interchanged between said alternating current circuit and said dynamo-electric machine.

4. In combination, an alternating current circuit, an induction motor comprising stator and rotor windings, electric valve converting means connected between said rotor and said alternating current circuit, said electric valve means comprising two groups of electric valves each having a control member and being connected in series relation across said alternating current circuit, said rotor winding being connected between said groups of electric valves to transmit alternating current from said rotor to said alternating current circuit, and a plurality of excitation circuits each including a saturable inductive device having a core member, a winding energized in accordance with the voltage of said alternating current circuit, a control winding energized in accordance with the currents of said rotor windings and a winding responsive to the resultant flux produced by said first mentioned winding and said control winding for impressing on the associated control member an alternating voltage of peaked wave form variable in phase to control the power factor at which power is transmitted between said alternating current circuit and said rotor windings.

5. In combination, an alternating current circuit, an induction dynamo-electric machine having an inducing winding and an induced winding, electric valve means comprising a control member and being connected between said circuit and said induced winding for transmitting energy there-between, an excitation circuit comprising a saturable inductive device having a primary winding energized in accordance with the voltage of said alternating current circuit, a control winding and a third winding responsive to the resultant flux produced by said first mentioned and said control winding for impressing on said control member an alternating voltage of peaked wave form, and means comprising inductive devices responsive to the current of said induced windings for energizing said control winding for controlling the phase of said alternating voltage of peaked wave form to control the power factor at which power is interchanged between said alternating current circuit and said dynamo-electric machine.

6. In combination, an alternating current circuit, an induction dynamo-electric machine having an inducing winding and an induced winding, electric valve apparatus comprising a plurality of electric valves for transmitting energy in both directions between said alternating current circuit and said induced winding, said electric valves being provided with control members for controlling the conductivities thereof, a plurality of excitation circuits each associated with a different one of said electric valves and each comprising a saturable inductive device having a core member, a primary winding energized in accordance with the voltage of said alternating current circuit, a control winding and a third winding energized in accordance with the resultant flux of said core member for impressing on the associated control member an alternating voltage of peaked wave form, means for adjusting the phase of the voltages impressed on the primary windings, inductive devices for impressing on the control windings alternating voltages variable in magnitude in accordance with the currents of said induced windings to control the power factor at which power is interchanged between said alternating current circuit and said induced windings, and means for adjusting the phase of the alternating voltages impressed on the control windings.

BURNICE D. BEDFORD.